Figure 1:
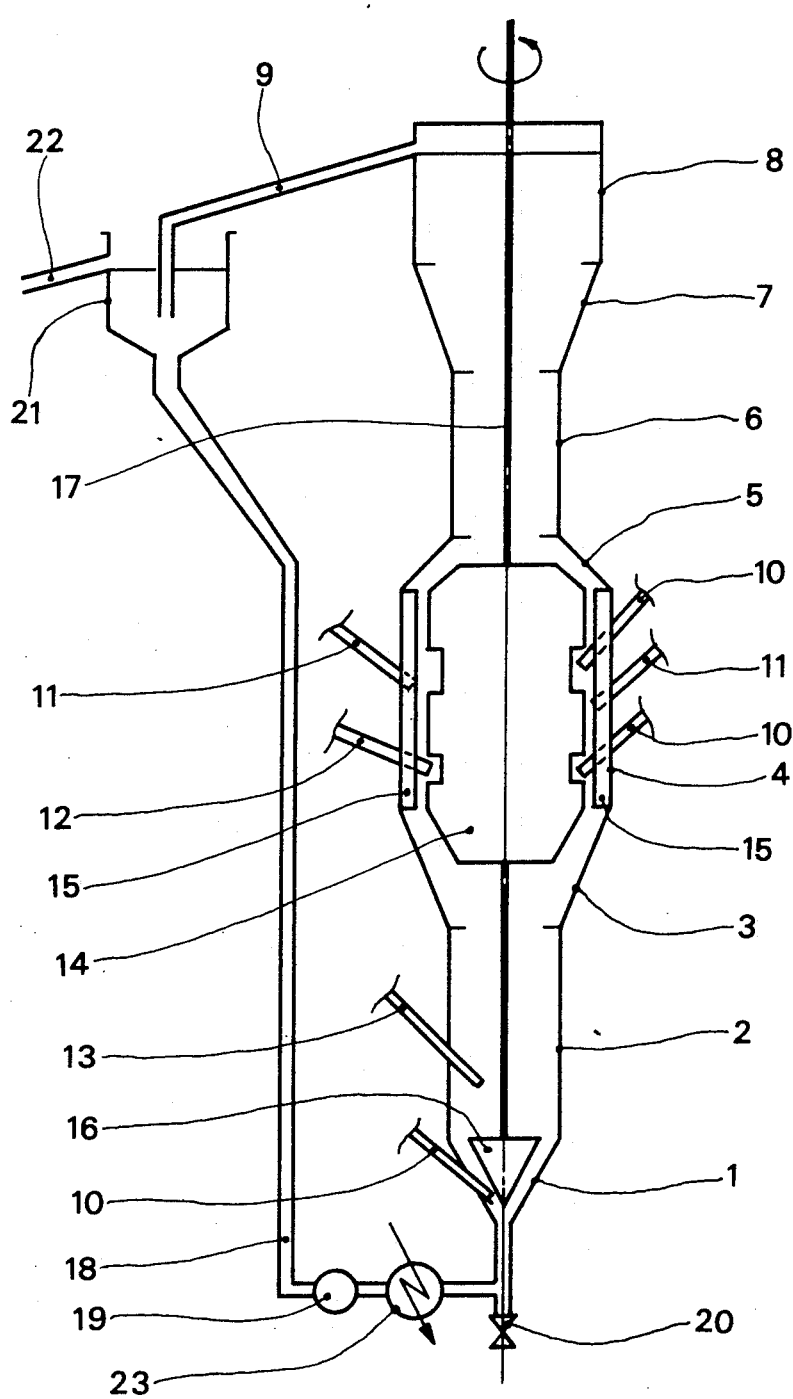

United States Patent [19]

Floréancig et al.

[11] Patent Number: 4,971,734
[45] Date of Patent: Nov. 20, 1990

[54] METHOD OF MAKING NUCLEAR FUEL PELLETS, COMPRISING PRODUCING AND USING POURABLE, FRITTABLE POWDERS OBTAINED DIRECTLY BY PRECIPITATION OF PEROXIDES

[75] Inventors: Antoine Floréancig, La Murette; Paul Mollard, Ste Foy les Lyon, both of France

[73] Assignee: Uranium Pechiney, Courbevoie, France

[21] Appl. No.: 377,117

[22] Filed: Jul. 10, 1989

[30] Foreign Application Priority Data

Jul. 11, 1988 [FR] France .................. 88 09845

[51] Int. Cl.$^5$ .................................. G21C 21/00
[52] U.S. Cl. ............................ 264/0.5; 252/5; 252/6; 252/125
[58] Field of Search ........................... 264/0.5

[56] References Cited

U.S. PATENT DOCUMENTS

| | | | |
|---|---|---|---|
| 4,254,086 | 3/1981 | Sanders | 264/43 |
| 4,522,769 | 6/1985 | Connolly, Jr. | 264/0.5 |
| 4,530,823 | 7/1985 | Dugua | 423/260 |

FOREIGN PATENT DOCUMENTS 1187352 9/1959 France .
1335272 of 1963 France .
2352750 12/1977 France .

OTHER PUBLICATIONS

Patent Abstract of Japan, vol. 4, No. 34 (C-3) [516], 3/22/80, p. 20 C 3; & JP-A-55 7527 (Mitsubishi Kinzoku K.K., 1/19/80.

Primary Examiner—Stephen J. Lechert, Jr.
Assistant Examiner—Nina Bhat
Attorney, Agent, or Firm—Dennison, Meserole, Pollack & Scheiner

[57] ABSTRACT

A method of obtaining pellets of $M_xO_y$ oxide, where M represents one or more elements used to make nuclear fuel pellets, as a means of obtaining very high density fritted pellets directly, i.e. without the intermediate powders being conditioned, comprising starting with a solution of soluble salts of the M elements, and treating them with hydrogen peroxide with the pH kept at from 2 to 2.5, in a continuous fluidized bed reactor comprising at least 3 superposed cylindrical sections of different diameters, the solutions in the central section being agitated vigorously, to obtain a precipitate which is subsequently calcined reduced, pressed then fritted.

17 Claims, 2 Drawing Sheets

METHOD OF MAKING NUCLEAR FUEL PELLETS, COMPRISING PRODUCING AND USING POURABLE, FRITTABLE POWDERS OBTAINED DIRECTLY BY PRECIPITATION OF PEROXIDES

TECHNICAL FIELD

The invention concerns the production of nuclear fuel pellets of high density, fritted MxOy oxides, using very free-flowing, compactable and frittable powders, which are obtained directly by precipitation of peroxides from solutions of soluble salts of the M elements. The powders obtained according to the invention need not undergo any additional conditioning treatment such as grinding, screening, granulation or the like, or have any additives, to make them pourable and frittable.

Throughout this specification M will represent any elements or mixtures of elements normally used to produce nuclear fuel pellets, and particularly any fissile or fertile elements such as U, Pu, Th, or Ce or neutrophage elements such as Gd or Hf.

STATE OF THE ART

The methods of producing nuclear fuel pellets generally include several stages, starting with aqueous solutions of soluble salts, generally nitrates or sulphates, of metallic elements forming the oxides contained in the final fuel pellets.

Solid powders are obtained during the intermediate stages. These normally have to undergo conditioning operations, such as grinding, screening, granulation and/or other treatments to make them readily pourable and suitable for pressing and fritting. It is important to eliminate such operations in order to simplify the process and also to avoid handling the powder. This always leads to dust and the formation of solid aerosols, which are harmful or dangerous to health and the environment and difficult to control.

Thus U.S. Pat. Nos. 4152395 and 4271127 describe a process which avoids such intermediate powder conditioning treatments while maintaining the quality of the finished product. In this process uranium is precipitated in peroxide form from a uranyl nitrate solution with a low concentration of uranium (70 to 150 g of uranium/l) by a dilute solution (15 to 20%) of hydrogen peroxide; the pH is kept between 1 and 2.5 by introducing a mixture of air and ammonia. The initial uranyl nitrate solution contains ammonium nitrate in cases where high density fritted oxide pellets are required (U.S. Pat. No. 4271127 column 2, lines 24–27 and column 3, line 59 to column 4, line 3).

Precipitation is carried out continously in a cylinder of constant cross-section; the reagents are introduced through pipes which discharge one above the other in a specific order (in the following order, working upwards: uranium solution, air-NH3 mix, hydrogen peroxide solution) and at specific distances, which are important if the desired shape of peroxide grains is to be obtained (0.127 col. 3,1.6–13): the suspension obtained is homogenised by vigorous agitation (with 3 renewals a minute) and completely discharged by overflowing at the top of the reactor. The uranium peroxide obtained by this process is in the form of spherical grains, and uniform precipitation is obtained due to the configuration of the apparatus.

Although such a process gives round grains of constant quality, it does not give a narrow particle size distribution, since the fine particles overflow with the rest of the suspension. Nor does it make it easy to control or vary the particle size distribution.

A further drawback of the process is that ammonium nitrate is included in the starting solution, in addition to that generated by the introduction of ammonia, in order to obtain high density fritted pellets.

A known way of solving the problem of controlling the particle size distribution and avoiding fines in the precipitated product is to use a fluidised bed reactor of constant cross-section. Thus grains with the desired particle size are obtained selectively, by drawing them off from the reactor section where they are formed. The fines remain in the upper reactor section, where they are enlarged before returning to the drawing off section. Thus the overflow from the reactor is either a clear liquid or a liquid containing just a low concentration of fines, which are then recycled by a decanting glass.

The application of such a process, e.g. to the precipitation of uranium peroxide from concentrated nitrate solutions, has proved unsuccessful. A large and increasing quantity of fines is produced, and this cannot be controlled even by lengthening the dwell time of the suspension in the reactor. It is thus impossible to obtain a peroxide with a narrow, controlled particle size distribution, i.e. without any fines. However, these properties and a spherical shape for the grains are necessary if pourable powders and very high density fuel pellets are to be obtained later in the process, without the powders undergoing additional conditioning treatment.

OBJECT OF THE INVENTION

In view of the problems encountered in the above-mentioned known processes, Applicants have perfected a stage-by-stage process, with the object of producing nuclear fuel pellets of fritted oxides from solutions of nitrates of the elements which are to be contained in the pellets.

The method of the invention firstly enables spherical peroxide particles to be precipitated, with a narrow, controlled particle size distribution, i.e. a reduced content of fines. These particles then give powders which can easily be poured and handled without any special conditioning treatment (such as grinding, screening, granulation or the like), and green oxide pellets with improved strength can be obtained directly. Finally, fritted oxide pellets can be obtained with very high density, generally over 96% of the theoretical density, without the use of any additives such as plasticiser, ammonium nitrate or the like.

Another object of the invention is to have a high productivity method of precipitating peroxides, i.e. a method using concentrated starting solutions and reagents, yet still obtaining the above-mentioned spherical particles with controlled sizes. Yet another object is to obtain a low flow rate and a small quantity of effluent to be treated or disposed of.

DESCRIPTION OF INVENTION

The invention is a method of obtaining pellets of fritted MxOy oxides, M representing one or more of the metals or elements used to form nuclear fuel pellets, comprising
(a) treating an initial solution of soluble salts of the element or elements M with hydrogen peroxide,
(b) obtaining a precipitate of peroxides suspended in mother liquors, (c) separating the precipitate from the mother liquors,
(d) calcining then reducing the precipitate, to give an intermediate oxide powder,
(e) pressing then fritting the powder.

The method is a direct way of obtaining fritted oxide pellets of very high density, generally over 96% of the theoretical density, and of improved quality, while avoiding any special conditioning treatment for the intermediate oxide powders. It is characterised in that the precipitation treatment (a) with hydrogen peroxides is carried out from solutions of the soluble salts, kept at a pH between 2 and 2.5 with ammonia gas or ammonia in solution, in a continuous, fluidised bed reactor; that the reactor comprises at least 3 superposed cylindrical sections of circular cross-section and different diameters, interconnected by frustoconical joining sections, the three cylindrical sections comprising a lower end cylindrical section, at least one central cylindrical section known as the working section, and at least an upper end cylindrical section known as the overflow section, the lower end section having a diameter smaller than that or those of the central cylindrical section or sections, and that the central section or sections are agitated vigorously.

At an intermediate stage the method also produces powders with spherical particles, a narrow, controlled particle size distribution with a reduced fines content, the particles pouring easily without any intermediate conditioning treatment such as grinding, grading, screening, granulation or the like. It also gives green oxide pellets of improved quality and strength. At the same time high productivity is obtained.

The method of the invention can be applied to obtaining MxOy fritted oxide pellets where M more particularly represents the metals or elements normally used in nuclear fuels, particularly the fissile or fetile elements, the neutrophage elements or any other additional ones. Thus M may preferably represent uranium with any content of isotopes, i.e. natural, depleted or enriched uranium from any source, e.g. from conversion, reprocessing or enrichment cycles including laser enrichment, but also plutonium, thorium, cerium, gadolinium, hafnium etc. M may equally represent a mixture of these elements and preferably mixtures which at least contain uranium.

The method comprises a plurality of stages, starting with a solution of soluble salts of the metal(s) or element(s) M which are to form the final fritted oxide pellets. The soluble salts are generally nitrates, sulphates or chlorides, although it is preferable to use nitrates or sulphates and more particularly nitrates. The solution is treated with a solution of hydrogen peroxide and ammonia, to precipitate peroxides suspended in the mother liquors. The solid is separated from the liquid and washed, then the solid powder obtained is calcined to convert it to oxide, and the oxide is reduced in an oven in a hydrogen and nitrogen atmosphere. Any conglomerates which may have formed during the heat treatment are removed from the reduced powder, and the powder is pressed to give green pellets which are then fritted.

It will be appreciated that no additive is included at the precipitation or pressing-fritting stage, and that the powders obtained after precipitation do not undergo any conditioning treatment or preparation such as grinding, formation of size grading sections, granulation etc., yet the pellets obtained are of improved quality.

This unexpected result is obtained by paying special attention to the peroxide precipitating conditions. These result in particles which give the powders the required properties.

Thus the solution of soluble salts may contain from 50 to 600 g of uranium/l, although it is recommended to work at concentrations of from 250 to 500 g of uranium/l. The hydrogen peroxide solution used has a concentration of at least 30% and preferably 70%, and is added in a quantity such that the excess at the end of precipitation is from 1 to 10 g/l and preferably from 2 to 5 g/l.

The pH may be kept within the 1.5 to 3.5 range by adding ammonia during precipitation, but it is preferable to operate between 2 and 2.5. As soon as the pH becomes more acid over production of fine particles takes place very rapidly. This effect is observed below pH 1.5, whereas when the pH is more alkaline, e.g. from pH 3.5, control of the pH becomes very difficult and operation is unstable.

The residual uranium content is always less than 20 mg of uranium/l and preferably from 2 to 15 mg/l. The temperature must be from 35° to 60° C. and preferably from 35° to 45° C. in order to obtain hydrated uranium peroxide containing 4 molecules of water. At a higher temperature, from 65° C., the dihydrate is obtained.

Precipitation must take place in a reactor where the reagents are circulated continuously, comprising:

a cylindrical lower end section of circular cross-section, known as the discharge section; its lower part preferably ends in a cone which is used for emptying and feeding in reagents and recycled liquors; the cone is preferably agitated.

an upper end section comprising at least one cylindrical section of circular cross-section which includes an overflow and is known as the overflow section; its lower portion may be connected to another cylindrical section of circular cross-section and smaller diameter, known as the upper section, by a frustoconical section.

The overflow is normally connected to a decanting device; the lower part of the device, containing the decanted fines, is connected by a recirculation pump to the tip of the cone of the lower section; the overflow containing the clear mother liquors forms the effluent which has to be treated and/or disposed of.

a central working section comprising at least one cylindrical section, again of circular cross-section and connected to the end sections by frustoconical portions. If the working section includes a plurality of cylindrical sections, these are interconnected by frustoconical portions.

It is essential for the working section to be agitated mechanically and vigorously, e.g. by an agitator with vertical blades. The end sections, apart from the overflow section, are also agitated but only moderately.

Opposing blades, fixed to the cylindrical walls in the working section, may be installed to improve agitation in that section.

There must be effective agitation in the central working section, to ensure a good turnover of contact surfaces between solid and liquid, thus encouraging enlargement of the grains, particularly the fines and thorough dispersion of the reagents. The agitating speed is from 20 to 80 rpm and preferably from 40 to 70. There must be moderate agitation in the upper and lower sections, just sufficient to avoid preferential passages with a chimney effect and to ensure renewal of the solid-liquid contact. Agitation helps to form spherules but it must not be too strong, otherwise it will result in homogenisation which is unfavourable to the bed.

The solution of initial soluble salts is introduced at several points in the working zone, preferably four. The other reagents (hydrogen peroxide solution, ammonia as a gas or in solution) are introduced at one or more points in the reactor. It is preferable for the various reagents to enter the reactor in the immediate vicinity of the agitators, e.g. at the level of the ends of the opposing blades, so that they are instantly dispersed.

The respective positions for the introduction of the reagents is not important. The reagents are not preheated. The excess of hydrogen peroxide is checked in the overflow from the overflow section.

Part of the saline starting solution may be placed in the cone at the bottom of the reactor or in the discharge section, if the mean particle size of the product extracted has to be reduced by increasing the quantity of fines produced at the bottom of the reactor. This possibility of adjusting the quantity of fines is fairly unusual in the art; when a fluidised bed process is used, surplus fines are generally produced and contained in the final product extracted. However, the invention avoids excessive fines production, since the excess can be used to reduce the mean size of the particles discharged. Thus the particles discharged, which are graded according to size, contain a minimum of fines and have a narrow, controlled particle size distribution.

The precipitated material is discharged by means of a tap installed in the cylindrical discharge section. Its adjustment determines the production rate and also fixes the solids content of the aqueous suspension in the reactor, or the dwell time of the particles in conjunction with the ascending speed. The solids content of the suspension in the working section is generally kept at from 300 to 1700 g/l, but it is preferable to set it at from 1100 to 1500 g/l. Productivity, in terms of one liter of the working section (including the adjacent linking frustoconical sections) is thus never less than 200 g of uranium/l and preferably 350 g.

In the working section the speed of the aqueous phase must be from 0.4 to 1.8 m/hr and preferably from 0.7 to 1.3 m/hr; it must be at least twice as low as the speed in the lower discharge section. Thus the diameter of the working section is larger than that of the discharge section; generally it is also larger than that of the upper section.

This speed is obtained by allowing for the flow rates of the reagents introduced and supplementing them with an adjustable recycling flow. This is obtained by circulating the aqueous phase emerging from the tip of the decanting glass, in a closed circuit upwards in the reactor, by means of the recirculating pump.

The particle size distribution is bound up with the ascending speed, the density of the suspension, the dwell time of the solid in the reactor and also with the production of fines.

Thus according to the invention substantially spherical, mechanically strong particles can be obtained, and the mean particle size (over 50%) can be selected by combining the operating conditions; it is generally over 10 microns and preferably from 30 to 80 microns. Moreover the particle size distribution is very homogeneous and very narrow, and does not include either fines or coarse particles. The diameter of the particles for which the cumulative oversize proportion is 10% and the diameter of those for which it is 90% are in a ratio of from 1.5 to 2.5. This ratio, which conveys the spread of particle sizes, indicates that 80% of the particles extracted have dimensions within that range. In prior art processes on the other hand, where the fines are not separated, this ratio is at best about 4 and often over 6.

Additives to accelerate the enlargement of the grains, such as isobutyl oleate, and additives to stabilise the hydrogen peroxide, such as pyrophosphates, benzoates or orthoxyquinoline sulphate, may be included at the precipitation stage.

When the suspension of particles has been removed from the reactor, the particles are separated from their mother liquors and washed to eliminate the ammonium salt, which was produced when the acid formed during precipitation of the peroxide was neutralised with ammonia.

The particles are then calcined at a temperature of from 350° to 600° C. in a nitrogen atmosphere, then reduced, generally at from 400° to 600° C., and preferably from 500° to 600° C., in an atmosphere of nitrogen and hydrogen. The powder thus obtained has improved pouring properties. The flow factor established under MPA (Metal Powder Association) Standard 3-45 of June 1945 (corresponding to ASTM B 213-48) shows that the powder takes about 25 seconds to flow through a 7.62 mm orifice, whereas powders which have been crushed and granulated as in prior art take from 40 to 70 seconds. The improvement will result in a gain in productivity at the pelleting stage and better filling of the cellular pelleting moulds, giving green pellets of improved quality. The absence of fines will similarly avoid problems bound up with jamming of the pelleting punch.

The powder has a high apparent density of over 2.5 and a BET specific surface area higher than the known level; it reaches from 5.5 to 7m$^2$ per gram, which is favourable to fritting.

The improvement in these properties will be a determining factor in obtaining the final fritted pellets with a density of over 96% of the theoretical level.

According to the invention, any coarse conglomerates are eliminated from the reduced powder by passing it e.g. through a 400 micron mesh screen, and the powder is lubricated by zinc stearate. No other conditioning treatment is applied, and the powder is sent direct to the pelleting station where it is automatically fed into a cellular mould and compressed cold by a punch. Very strong pellets are obtained, with a high green density of from 5.8 to 6.1. An abrasion test carried out on the green pellets gives a weight loss of less than 5%, whereas the same test applied to green pellets from prior art powders gives a weight loss of 20 to 30%.

The green pellets are then fritted in a hydrogen atmosphere at a temperature of about 1750° C. The density obtained is over 96% of the theoretical level. The pellets are virtually homogeneous:

there is no flaw in texture or appearance; they have not suffered any damage, nicking, cracking, pitting or the like during handling, fritting or the post fritting grinding;

they have very regular porosity and a regular grain size of over 8 micron.

FIG. 1 shows a reactor for carrying out the method of the invention. In it:

1 is the emptying cone with its agitator 16

2 is the lower extracting section

3 - 4 - 5 are the working section, comprising frustoconical joining portions 3 and 5 and the cylindrical portion 4

6 - 7 - 8 are the upper end section, comprising the cylindrical upper section 6, the joining frustoconical portion 7 and the overflow section 8 fitted with overflow pipes 9

10 are the nitrate solution feed locations
11 are the ammonia feed locations
12 are the hydrogen peroxide feed locations
13 is the extraction means for the suspension
14 is the blade type agitator
15 are the opposing blades fixed to the inner wall of the cylinder of the working section
17 is the rotary shaft on which the agitators 14 and 16 are fixed
18 is the pipe for recycling the overflow
19 is the recycling pump
20 is an emptying valve
21 is a decanting glass for recycling the fines carried along in the overflow 9 and for discharging the effluent at 22
23 is an exchanger to keep the temperature of the fluidised bed at the set level.

Figure 2:
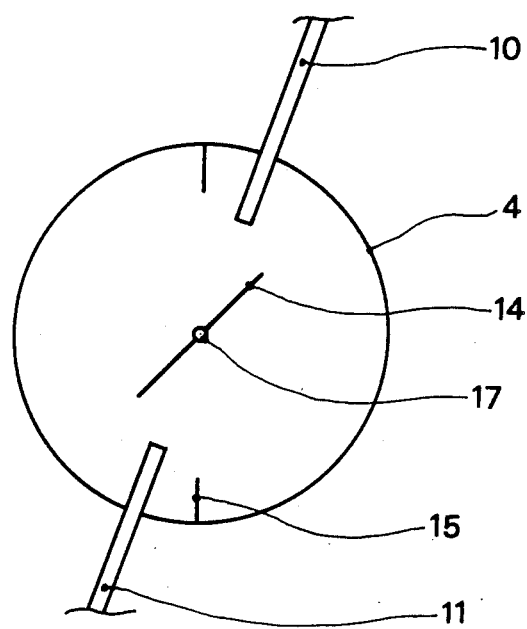

FIG. 2 is a cross-section showing the theoretical layout of the feed locations for the reagents, when they enter the cylindrical working section of the reactor at the level of the ends of the opposing blades. In it
4 is the cylinder of the working section
14 is the blade type agitator with its shaft 17
15 are the opposing blades
10 is a feed location for the nitrate solution
11 is a feed location for ammonia.

EXAMPLE 1

This example demonstrates that a pourable powder with a sufficiently large particle size with sufficiently homogeneous and narrow distribution to give high density fritted pellets, cannot be obtained by conventional precipitation of peroxide in a normal grading fluidised bed reactor, without the intermediate oxide powders being given any preliminary conditioning treatment.

The process starts with a uranyl nitrate solution containing 350 g of uranium/l. The uranium peroxide is precipitated in a conventional grading fluidised bed reactor with an upward flow, giving size grading and a decreasing solids content of the suspension in a downward direction. At the base of the reactor there is a cone with a cylinder 700 mm high and 70 mm in diameter above it. Above the cylinder there is a decanting and overflow section 100 mm in diameter (i.e. 2.7 liters for the working section). The decanting and overflow section has a low speed agitator fitted with single bars. The overflow passes into a decanting glass, the base of which leads back to the reactor.

The following inlets and outlets are provided:
an inlet for the initial uranium solution in the cone and two in the cylinder. The total flow is 120 g of uranium per hour.
two inlets for the $H_2O_2$ solution in the cylinder
three inlets for $NH_3$ in the cylinder, so that the pH can be kept at 2 in the lower part of the bed and 2.5 in the upper part
an outlet for the suspension formed, located in the bottom quarter of the cylinder.

The reaction is then found to produce an increasing quantity of fines. The quantity cannot be controlled even by greatly diminishing the feed rate and adjusting the ascending speed and agitation. All the uranium solution is then placed in the cone, in order to avoid local supersaturation which is probably responsible for the excessive production of fines. No improvement is obtained.

Thus the powder obtained from the precipitation contains a high proportion of non-spherical fines, and the spread of particle sizes is about 6; the powder does not flow readily and would have required intermediate conditioning treatment before it could be used to obtain fritted pellets. Moreover it is found that a production rate of 14 g of uranium per hour per liter of active section must not be exceeded if the production of fines is to be controlled. This rate is much too low for industrial use.

Since the powder does not meet the set requirements, there is no point in carrying out the following stages in the process.

EXAMPLE 2

This example illustrates how fritted uranium pellets can be obtained according to the invention.

The initial solution is a uranyl nitrate solution containing 300 g of uranium/l. Precipitation is carried out in a reactor comprising a cylindrical working section 140 mm in diameter and 160 mm high, joined by two frustoconical portions to two cylinders 72 mm in diameter. The discharge cylinder at the bottom ends in a cone and the upper cylinder is joined by a frostoconial portion to an overflow cylinder 140 mm in diameter and 100 mm high. The working section has a total volume of 3.6 liters.

The agitator comprises a large vertical blade (width 110 mm, height 220 mm) with four scalloped portions on the vertical ribs, for the passage of 4 means for injecting the uranium solution, and 4 apertures 25 mm in diameter right in the metal sheet. It is mounted on a shaft extending along the axis of the reactor. Two opposing blades (height 160 mm, width 10 mm) are fixed on the cylindrical part diametrically opposite one another. The agitator turns at 50 rpm. The upper and lower cylindrical sections each have two pairs of flat agitating bars 10 mm high and fixed on the same shaft. The reagents are fed in as follows:
into the working section through 4 uranium solution injectors discharging at the level of the opposing blades, and through 2 injectors for ammonia at a concentration of 160 g/l, discharging at the level of the wall
through a 30% $H_2O_2$ injector located at the bottom of the lower cylindrical section.

The suspension of particles is extracted by means of a tap which extends about 1 cm into the lower discharge section.

The pH is kept at from 2 to 2.5 and the content of $H_2O_2$ in the overflow permanently at from 3 to 5 g/l. The overflow, which contains non-decanted fines, is recycled to the bottom of the reactor after passing into a decanting glass. The function of the glass is to recycle the fines to enlarge them, to have the particles graded in the discharge section and to help to suspend the fluidised bed.

The rate at which the uranium solution is fed in at the first stage is gradually brought to 760 g of uranium/l. When the bed has been stabilised, the solids content of the working section is 1200 g/h. Since the particles extracted are spherical, their mean particle size increases up to 75 microns. The fines content of the recycled overflow increases from 5 to 38 g/l. These fines are not found in the suspensions extracted, as the particle size distribution is from 2.28 to 2.45; this indicates that they have been enlarged before extraction.

At the second stage two more feed locations for the uranium solution are provided: one in the cone at the bottom of the reactor and one in the lower cylindrical section.

The total uranium feed is gradually brought to 1550 g of uranium/h, including 220 g of uranium/h by means of the two feed locations in the lower section. The solids content of the working section is 1330 g/l. The mean size of the particles extracted gradually reaches 69 microns, with a particle size spread of 1.6.

Eight samples of suspension are taken during this production, with mean particle sizes ranging from 32 to 69 microns and with the spread of particle sizes rising from 1.6 to 2.45. The samples are then filtered and washed, calcined at 575° C. in a nitrogen atmosphere (6 m³/h), then reduced at 600° C. in an atmosphere of nitrogen (2 m³/h), to give a $UO_2$ powder with spherical grains; its properties are set out in Table 1.

TABLE I

| | PROPERTIES OF $UO_2$ POWDERS | | | | | | | | |
|---|---|---|---|---|---|---|---|---|---|
| SAMPLE NO. | | 1 | 2 | 3 | 4 | 5 | 6 | 7 | 8 |
| Peroxide | Mean particle size of peroxide obtained on precipitation at 50 microns | 51 | 61 | 63 | 68 | 69 | 32 | 37 | 41 |
| $UO_2$ Powder | Apparent density | 2.75 | 2.69 | 2.68 | 2.71 | 2.75 | 2.65 | 2.53 | 2.62 |
| | Flow factor diameter 7.62 mm | 25 | 24 | 24 | 26 | 20 | 20 | 24 | 29 |
| | Mean particle size d50 (micron) | 37.4 | 41.7 | 43.1 | 44.9 | 38.3 | 23.8 | 27.6 | 32.1 |
| | BET specific surface area ($m^2/g$) | 6.33 | 6.50 | 6.62 | 6.80 | 5.63 | 6.31 | 6.07 | 6.92 |
| | O/U ratio | 2,123 | 2,125 | 2,113 | 2,126 | 2,122 | 2,117 | 2,119 | 2,118 |
| | H20 content (ppm) | 1965 | 1710 | 1655 | 1430 | 1465 | 1585 | 1605 | 1760 |

The $UO_2$ powders are then passed through a 400 micron mesh screen without leaving any oversize residue, then lubricated by mixing them with 0.3% of zinc stearate.

They are then used directly in an automatic pelleting machine to give green pellets 9.9 mm in diameter and about 15 mm long. These are fritted in a continuous furnace, comprising a prefritting zone at 400 to 700° C. then a fritting zone at 1750° C., in an atmosphere of dry hydrogen (6 m³/h). The fritted pellets are then ground on a diamond wheel. The properties of the green and fritted pellets are given in Table 2.

TABLE II

| | GREEN PELLETS | | | FRITTED PELLETS |
|---|---|---|---|---|
| Sample No. | Compacting Pressure (T) | Green Density | Brittleness (% weight loss) | Density (% of theoretical density) |
| 1 | 5.2 | 6.03 | 2.8 | 96.655 |
| 2 | 5.7 | 6.03 | 4.2 | 96.708 |
| 3 | 6.0 | 5.99 | 2.9 | 96.099 |
| 4 | 6.2 | 6.01 | 3.9 | 96.328 |
| 5 | 5.3 | 6.02 | 2.6 | 96.407 |
| 6 | 5.7 | 6.05 | 2.9 | 96.082 |
| 7 | 5.5 | 6.05 | 2.3 | 96.157 |
| 8 | 5.8 | 6.02 | 2.9 | 96.436 |

It will be seen that all the densities of the fritted pellets are over 96% of the theoretical density. The pellets also have very good thermal stability (variation in density less than 0.6% of theoretical density) and a very homogeneous structure (regular porosity and no flaws).

We claim:

1. A method of obtaining pellets of fritted $M_xO_y$ oxides, M representing one or more of the metals or elements used to form nuclear fuel pellets, comprising the steps of:
    (a) treating an initial solution of soluble salts of the element or elements M with hydrogen peroxide;
    (b) obtaining a suspension comprising a precipitate of peroxides suspended in mother liquors;
    (c) separating the precipitate from the mother liquors;
    (d) calcining then reducing the precipitate, to give an intermediate oxide powder; and
    (e) pressing then fritting the powder,
    Wherein the precipitation treatment (a) with hydrogen peroxide is carried out from concentrated solutions of the soluble salts, kept at a pH between 2 and 2.5 with ammonia gas or ammonia in solution, in a continuous, fluidised bed reactor;
    that the method reactor comprises at least 3 superposed cylindrical sections of circular cross-section and different diameters, interconnected by frustoconical joining sections, the three cylindrical sections comprising a lower end cylindrical section, at least one central cylindrical section comprises a working section, and at least an upper end cylindrical section comprising an overflow section, the lower end section having a diameter smaller than that of the central cylindrical section or sections, and
    that treatement in the central section or sections is with vigorous agitation of the solution.

2. The method of claim 1, where in M represents at least one of the metals or elements used in nuclear fuels, comprising, Pu, Th, Ce, Gd, and Hf.

3. The method of claim 2, wherein M represents mixtures containing at least uranium.

4. The method of claim 2, wherein M represents uranium only.

5. The method of any of claims 1 to 4, wherein the soluble salts are sulphates or nitrates.

6. The method of claim 5, wherein the initial solution is a uranyl nitrate solution at a concentration of from 50 to 600 g of uranium/1

7. The method of claim 1, wherein the peroxides are precipitated with a strong hydrogen peroxide solution at a concentration of at least 30%.

8. The method of claim 7, wherein sufficient hydrogen peroxide is added to maintain an excess of 1 to 10 g/l measured in the overflow from the overflow section.

9. The method of any of claim 1 to 4, wherein the initial solution of soluble salts is fed in partly into the lower end section.

10. The method of claim 1, wherein the suspension is discharged from the cylindrical lower section.

11. The method of claim 1, wherein the aqueous phase flows downwardly in the reactor, through part of the overflow from the overflow section being recycled into a cone at the bottom of the reactor, adjoining the discharge section.

12. The method of claim 1, wherein the solids content of the suspension in the working section is kept at from 300 to 1700 g/l.

13. The method of claim 1, wherein the speed at which the aqueous phase flows into the working section is at least twice as slow as that in the lower discharge section.

14. The method of claim 1, wherein the ascending speed in the working section is from 0.4 to 1.8 m/h.

15. The method of claim 1, wherein the reactor includes a cylindrical upper section, between the upper overflow section and the central working section, and that the diameter of said cylindrical upper section is less than that of the working section.

16. The method of claim 1, wherein the precipitate separated from its mother liquors is calcined at a temperature of from 350 to 600° C. in a nitrogen atmosphere.

17. The method of claim 1, wherein the calcined precipitate is treated with a reducing agent at a temperature of from 400 to 600° C.

18. The method of claim 5, wherein the initial solution is a uranyl nitrate solution at a concentration of from 250 to 500 g of uranium/l.

19. The method of claim 7, wherein sufficient hydrogen peroxide is added to maintain an excess of 2 to 5 g/l, measured in the overflow from the overflow section.

20. The method of claim 1, wherein the solids content of the suspension in the working section is kept at from 1100 to 1500 g/l.

21. The method of claim 1, wherein the ascending speed in the working section is from 0.7 to 1.3 m/h.

22. The method of claim 1, wherein the calcined precipitate is treated with a reducing agent at a temperature of from 500° to 600° C.

* * * * *